United States Patent [19]

Piontek et al.

[11] Patent Number: 5,427,429
[45] Date of Patent: Jun. 27, 1995

[54] CONVERTIBLE TOP BOW

[75] Inventors: David P. Piontek, Canton; John M. Yera, Troy; George W. Klein, Dearborn Heights, all of Mich.

[73] Assignee: ASC Incorporated, Southgate, Mich.

[21] Appl. No.: 100,445

[22] Filed: Aug. 2, 1993

[51] Int. Cl.6 .............................................. B60J 7/12
[52] U.S. Cl. .................................. 296/118; 296/116; 296/121
[58] Field of Search ............... 296/107, 118, 121, 116, 296/901

[56] References Cited

U.S. PATENT DOCUMENTS

| | | |
|---|---|---|
| 10,422 | 12/1883 | Raymond . |
| 264,203 | 9/1882 | Smith . |
| 268,436 | 12/1882 | Smith . |
| 328,526 | 10/1885 | Sherwood . |
| 988,083 | 3/1911 | Ellis . |
| 2,538,931 | 1/1951 | Zummach ........................... 296/118 |
| 2,768,023 | 10/1956 | Landon . |
| 2,823,951 | 2/1958 | Shahl ............................. 296/118 X |
| 4,573,732 | 3/1986 | Muscat . |
| 4,720,134 | 1/1988 | Seifert . |
| 4,929,015 | 5/1990 | Bauer . |
| 5,000,507 | 3/1991 | Baxter . |
| 5,009,463 | 4/1991 | Saitoh et al. . |

*Primary Examiner*—Joseph Pape
*Attorney, Agent, or Firm*—Harness, Dickey & Pierce

[57] ABSTRACT

An improved bow for a convertible top is described which is molded from a polymeric resin such as nylon and reinforced with glass fibers. The bow has a general I beam cross section and can be reinforced for additional strength. The ends of the bow can be configured to retain stay pads or tack strips. The bow can be molded in a set of tools that have interchangeable ends and retain the same mold for the central section of the bow. The interchangeable tools for producing the ends of the bow allow for greater manufacturing flexibility in that the central tool is retained for use in producing multiple styles of bows while expenses only have to be incurred for additional tooling for the ends of the bows.

20 Claims, 2 Drawing Sheets

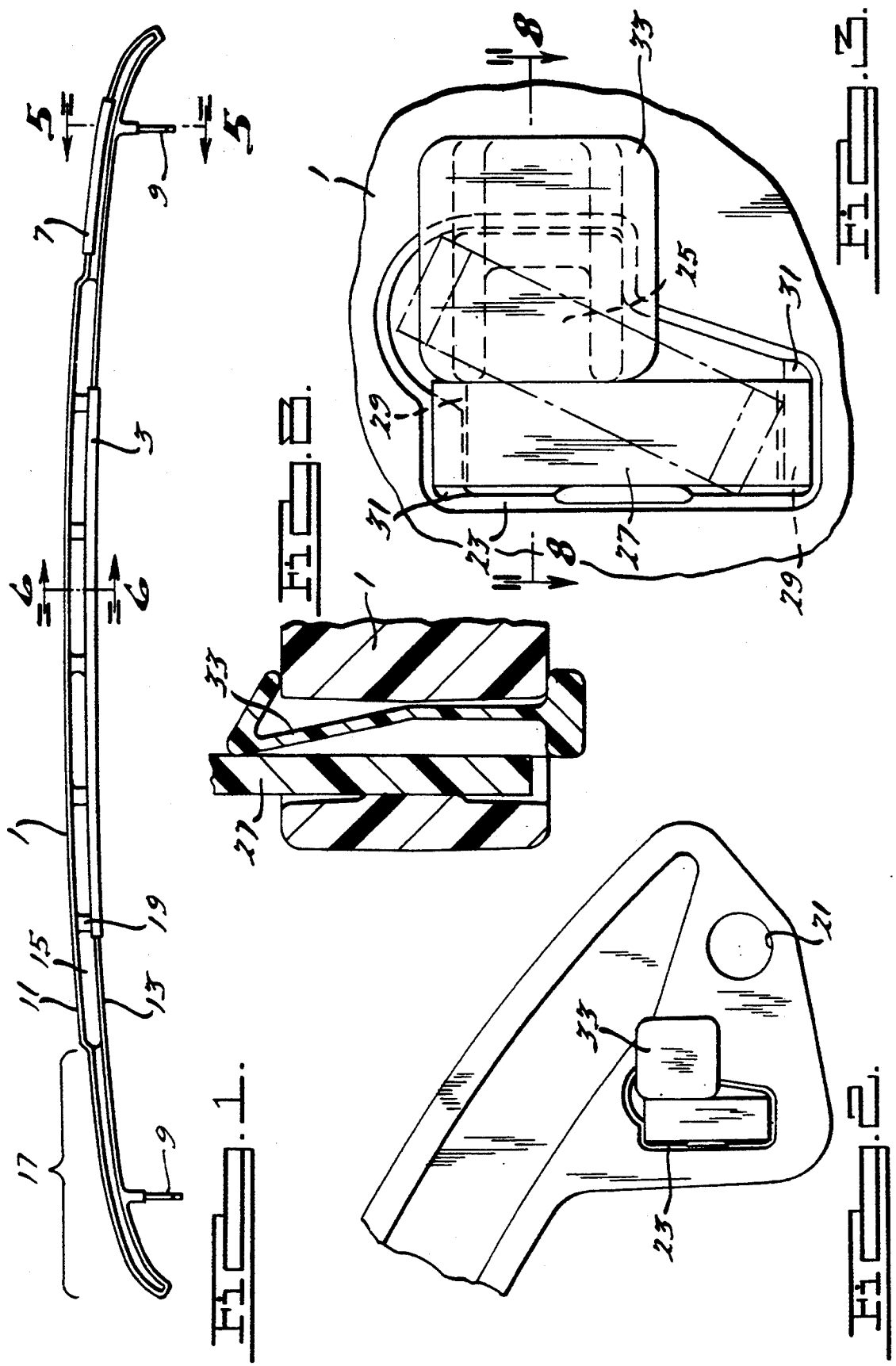

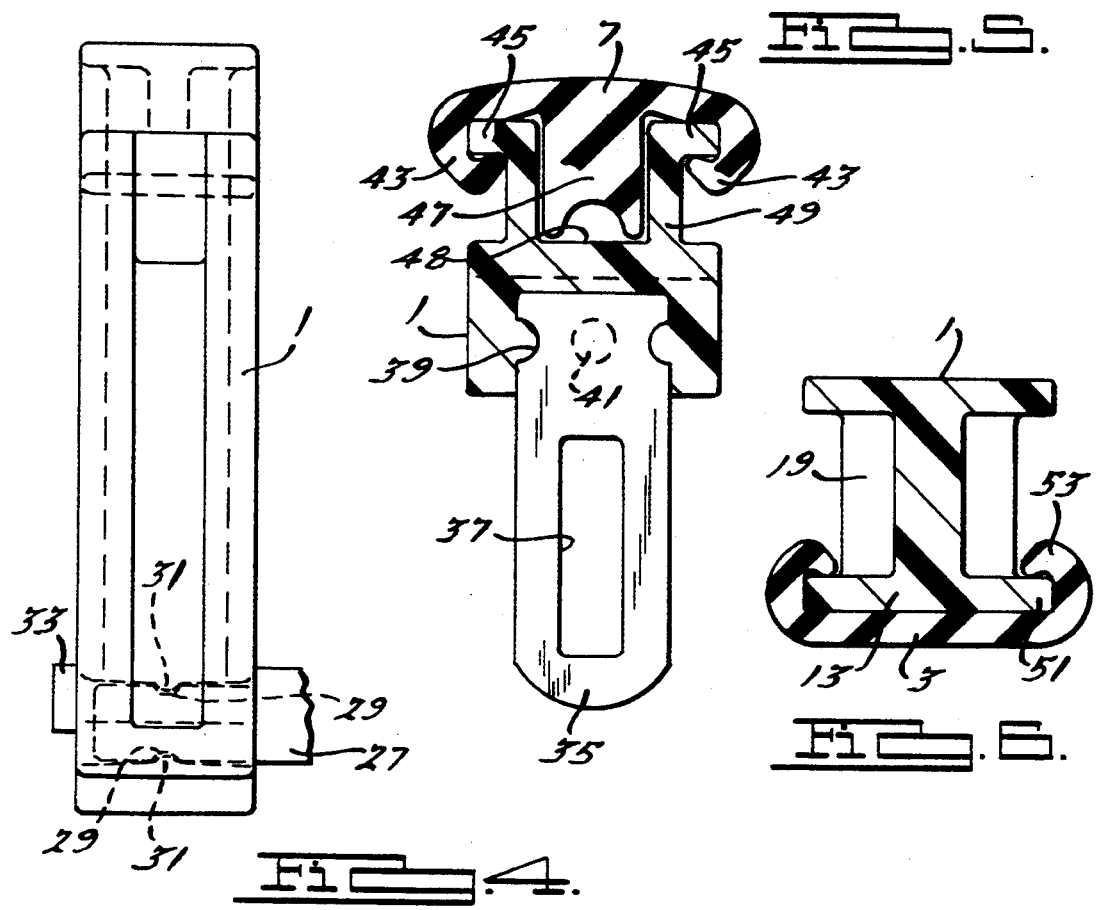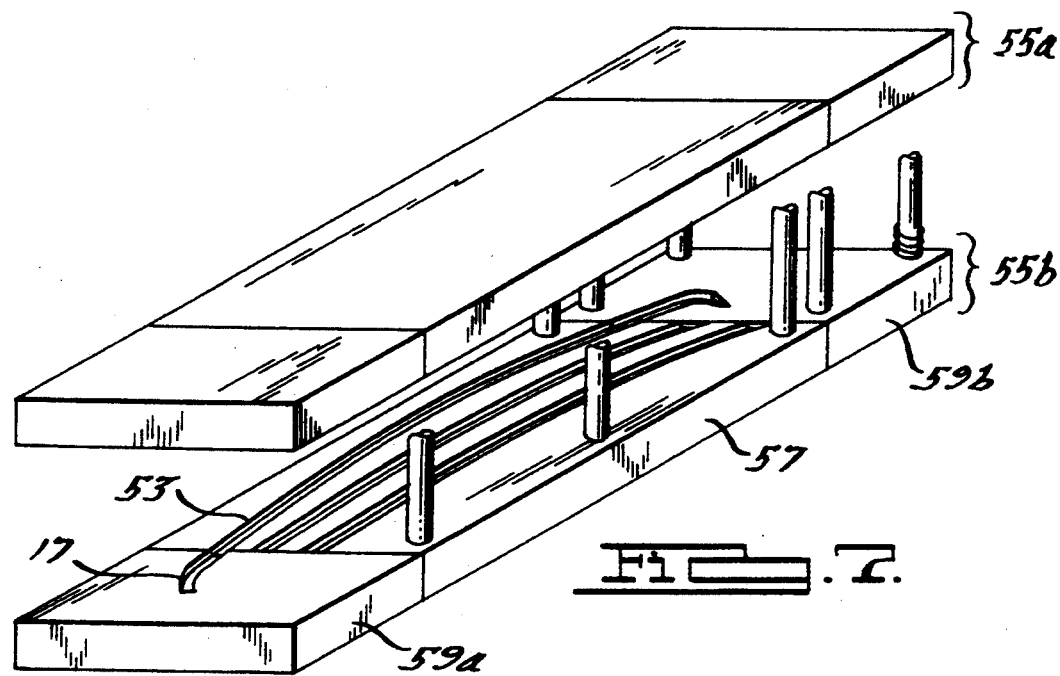

CONVERTIBLE TOP BOW

BRIEF SUMMARY OF THE INVENTION

This invention relates to vehicle roof structures and more particularly to roof structures for vehicles such as cars, trucks, vans, etc.

The invention is especially concerned with roof structures comprising beams also known as roof bows which extend transversely across the vehicle in what is conventionally known as a convertible top.

Prior art convertible top bows were generally formed of wood and/or metal. Primarily, the convertible top bows were formed of metal in either a tubular, u-channel, box section or solid configuration. The bow material would generally be cut into lengths of a particular cross section, then configured by bending or forming into a desired bow configuration. The prior art bows suffer from several disadvantages. They are relatively heavy for the amount of structural strength they provide. They are prone to corrosion and need to be periodically lubricated for proper operation in conjunction with the convertible top linkage. The prior art convertible top bows were also subject to deformation under loads such as car washes. Given the prior art construction, this could result in a convertible top bow taking a set i.e., remaining deformed after the load was removed. This could result in diminished esthetic appearance and reduced function.

It is an object of the present invention to produce a convertible top bow that is lighter in weight and resists greater loads per unit weight. It is another object of the invention to provide a convertible top bow that is resistant to taking a memory or set in a deformed position. It is another object of the invention to produce a convertible top bow that is resistant to corrosion and is self lubricating. It is a further object of the invention to produce a convertible top bow that is easily manufactured and readily incorporated into a wide variety of convertible top mechanisms. Further objects of the invention will become apparent from the following descriptions.

A convertible top bow is described having a generally I beam cross section. The bow is preferably made of a polymeric resin material reinforced with glass fibers. The bow can be formed from conventional molding techniques such as injection molding or compression molding. The bow can have different cross sectional configurations and/or areas along its length, either for reinforcement at important areas and/or to allow for the installation of related hardware such as stay pads and linkage connectors. An embodiment of the invention can also be formed that allows the molding in place of linkage connection and related hardware.

BRIEF DESCRIPTION OF THE DRAWINGS

FIG. 1 is a elevational view of a convertible top bow according to the present invention.

FIG. 2 is an elevation view of the end portion of a bow according the present invention.

FIG. 3 is an enlarged portion of FIG. 2 showing an alternate attachment mechanism for the convertible top linkage.

FIG. 4 is a side elevational view of the bow of FIG. 1.

FIG. 5 is a cross sectional view through line 5—5 of FIG. 1.

FIG. 6 is a cross sectional view through line 6—6 of FIG. 1.

FIG. 7 is a perspective view of a mold for making the invention.

FIG. 8 is a cross sectional view through line 8—8 of FIG. 3 with the linkage in an installed position.

DETAILED DESCRIPTION OF THE INVENTION

FIG. 1 illustrates a convertible top bow 1 of the present invention. The bow is designed to span the roof area of the vehicle transversely and in combination with other bows via linkage (not shown) to create a convertible top structure. Headliner retainer pad 3 is fitted to the bow 1 and designed to have the headliner (not shown) stitched or otherwise secured to the headliner retainer pad 3 to retain the headliner in place while the convertible top is in its extended position as well as in its retracted position. Stay pad 7 is retained on the bow 1 at either or both of the bow ends 17. Stay pad 7 will preferably have webbing attached to it so as to secure the bows at a proper spaced relation to one another while the top is in the extended position and the webbing is stretched. The webbing also allows the bows to be stacked together when the convertible top is in its retracted position.

Linkage mounts 9 are molded in place in the bow 1 and serve to allow attachment of the convertible top linkage to the bow.

The bow 1 is generally of an I beam cross section having an upper flange 11 and a lower flange 13 connected by an intermediate web 15. The bow distal end portion 17 profile or cross section can be of a different area or configuration depending on the load, such as compressive or torsional load, expected to be exerted upon the bow. For example, in a preferred embodiment the cross section of the distal end can be reduced compared to the cross section of the central portion of the bow depending on the load requirements for the particular convertible top application. The bow end 17 is also curved to fit the particular esthetics or styling profile desired in the completed convertible top when extended. Additional reinforcing material in the form of thickened areas or stanchions 19 can be integrated into the web 15 to further reinforce the bow 1 from flexing or twisting under loads. The bow itself is preferably formed in one piece through conventional molding processes such as injection molding or compression molding. The bow is susceptible of being molded in a novel mold as described below.

The preferred material for the bow is a heat-stabilized UV-resistant nylon, preferably reinforced by long or short glass fibers. An example of the preferred composite material is long glass fiber reinforced, easy molding, heat stabilized, UV resistant nylon 6/6, Verton RF-EM-HS series sold by LNP Engineering Plastics, Inc., Exton, Pa., containing 60% long glass fiber. Certain materials such as polyethylene can be used which also have the effect of providing a means of lubrication. The waxy feel of polyethylene can aid in the reduction of friction with the linkage.

Turning to FIG. 2, the use of polymeric material in the molding operation allows for ready incorporation of attachment sites for linkage. Whereas prior art metal bows had to be additionally deformed and/or have attachment sites welded or machined into the bows, the present invention allows for attachment sites to be directly molded in. FIG. 2 shows two attachment site arrangements. The circular attachment site 21 can be molded in for receiving a linkage rod that can then be conventionally secured against removal by way of a threaded fastener over the end of the linkage rod, such as a tinnerman cap pushed circular on the linkage rod to fasten it. Other retaining means for a linkage rod known in the art could alternatively be used. Alternatively, the molding operation can locate the attachment site by creating a circular depression. The circular attachment site 21 can then be finished after molding by removing any flashing or leftover material to create an attachment site extending through the bow 1. Additionally or alternatively, a bayonet style attachment site 23 can be molded. The bayonet style attachment allows a rectangularly cross sectioned linkage arm to be inserted through the attachment site 23 in a canted position and then twisted to its upright position to lock it in place against removal.

Turning to FIG. 3 an enlarged detail of the bayonet attachment site 23 is illustrated. The linkage member is shown as being inserted in a canted position 25 through the opening. Once linkage member is inserted to the proper depth in the opening 23, it is twisted counterclockwise to assume its operable position shown by reference numeral 27. In its operable position the linkage member can function to allow proper retraction and extension of the convertible top. In its operable position linkage member channel 29 rests over the bow retaining ridge 31 to prevent withdrawal of the linkage member 27 from the bow 1. In addition, retaining clip 33 can be engaged to prevent the linkage from reassuming its canted position 25. For disassembly purposes, retaining clip 33 can be retracted and the linkage slat twisted to the canted position 25 and removed. The retaining clip 33 can be made out of nylon with or without additional fiber reinforcement.

FIG. 8 shows the linkage member in its operable position 27 secured by retaining clip 33.

FIG. 4 shows the bayonet style attachment of the linkage as described with reference to FIGS. 2 and 3 from the end of bow 1. The interference fit of the retaining ridges 31 with the linkage member channels 29 prevent the withdrawal of the linkage member 27 without canting the linkage member. Retaining clip 33 prevents the linkage member 27 from being canted for removal until the retaining clip 33 is withdrawn.

FIG. 5 illustrates an alternate method of attachment of the linkage to the bow 1. During the molding operation for the bow 1 preformed linkage bracket or hardware 35 can be molded in place so as to be secured in the proper location of the bow. Linkage hardware 35 has an attachment site 37 preformed in the hardware to receive the linkage mechanism. Cut-outs 39 formed in the hardware allow the material of the bow to secure the linkage hardware 35 to the bow when the material flows into the cut-out during the molding process. Once the material is hardened in the cut-outs it resists forces tending to extract the hardware 35 from the bow 1. Alternatively to cut out 39 a hole 41 can be bored through the hardware 35 to allow material to flow through the hardware and secure it to the bow. The hardware 35 can be made of a variety of materials. A preferred material is steel or steel alloy.

Also illustrated in FIG. 5 is the stay pad 7. The stay pad serves to secure webbing running the length of the convertible top to the bow to properly space the bow in the convertible top when the webbing is extended. To retain the stay pad in its proper location, the stay pad lips 43 engage over bow flanges 45 for a "snap-fit". A central core 47 of the stay pad projects downwardly between the flange walls 49 of the bow. The central core serves to stabilize the stay pad and resist shifting of the stay pay laterally relative to the bow.

FIG. 6 illustrates the bow 1 with a headliner retainer pad over the side rim 51 of lower flange 13. The headliner retainer pad is retained in place by a snap fit of the headliner retainer pad lips 53 over the rim 51. Both the stay pad 7 and the headliner retainer pad 3 are preferably formed from a resilient elastomeric material. The stay pad retaining channel 48 generally extends over only the end portion of the bow 17 and not the central portion. Tack strips or headliner retaining pads may be placed over the central portion of the bow by snap fitting the strips over either upper flange 11 or lower flange 13 as discussed in reference to FIG. 6.

FIG. 7 illustrates a set of tools for molding convertible top bows of the type described above. It has been found that many car models have the same arc for the central section 53 of the bow with particular models varying primarily in the configuration of the end portion 17 of the bow. Thus, convertible top bows for a majority of models of vehicles can be molded using the same mold for the central portion 53 of the bow and varying only the portion of the tool that molds the end portion 17. FIG. 7 illustrates a pair of tools 55a and 55b which comprise a central section 57 which molds the central portion 53 of the bow in conjunction with specific molds 59a and 59b. The combination of tools simultaneously molds at least one complete bow. This can help reduce costs because additional bows can be molded with only an additional investment in tooling for the ends without incurring additional costs for reproducing the central portion 57 of the tool. Tools used for producing the convertible type bows of the present invention can be of conventional molding type such as injection molding or compression molding.

While the above detailed description describes the preferred embodiment of the present invention, the invention is susceptible to modification, variation, and alteration without deviating from the scope and fair meaning of the subjoined claims.

What is claimed is:

1. A bow for a convertible top comprising:
    a central beam portion, having a first cross section, comprising an upper flange portion, a lower flange portion and a web portion connecting said upper and lower flange portions;
    a distal beam portion having a second cross section, integrally attached to said central beam portion and having a linkage attaching aperture molded therein.

2. The bow of claim 1 wherein said central beam portion further comprises thickened web portions alternating with unthickened web portions to further support said flange portions.

3. The bow of claim 1 wherein said distal beam portions further comprise stay pad retaining walls defining a stay pad channel.

4. The bow of claim 3 wherein said bow further comprises:
    an elastomeric stay pad comprising a central portion projecting into said stay pad channel and a stay pad lip adapted to engage said stay pad retaining flange.

5. The bow of claim 1 wherein said linkage attaching aperture further comprises a preformed linkage attaching means molded in place during the forming of said bow.

6. The bow of claim 1 wherein said linkage attaching aperture further comprises an irregularly shaped opening for receiving a linkage member in both a first retractable orientation and a second non-retractable orientation.

7. The bow of claim 6 wherein said linkage member is secured in said second orientation by a retaining clip.

8. The bow of claim 1 formed of a polymeric resin material.

9. The bow of claim 8 wherein said polymeric resin material comprises a polyamide.

10. The bow of claim 9 further comprising a filler material mixed with said polymeric resin material.

11. The bow of claim 10 wherein said polymeric resin material further comprises nylon and said filler material comprises glass fibers.

12. The bow of claim 1 wherein said distal portion is formed in a first mold and said central beam portion is formed in a second mold simultaneously.

13. The bow of claim 1 wherein said first cross section is of a larger area than said second cross section.

14. A bow for a convertible top comprising:
   a central beam portion having an upper flange portion, a lower flange portion, and a web portion connecting said upper and lower flange portions said central beam portion having a first cross section;
   a distal beam portion integrally attached to said central beam portion having linkage attaching apertures molded therein said distal beam portion having a second cross section;
   an elastomeric stay pad engaged on said distal beam portion;
   a headliner retaining pad engaged on said lower flange portion;
   said central beam portion and distal beam portion formed of a molded polymeric resin material.

15. The bow of claim 14 wherein said polymeric resin material further comprises nylon mixed with a glass fiber filler.

16. The bow of claim 14 wherein said distal beam cross section has a reduced cross section from said cross section of said central beam portion.

17. The bow of claim 16 wherein said distal beam portion further comprises stay pad retaining walls defining a stay pad channel and terminating in a stay pad retaining flange adapted to engage at least one stay pad lip.

18. A convertible top bow comprising:
   molded polymeric central beam portions;
   molded polymeric distal beam portions integrally molded to said central beam portion;
   linkage attaching means molded in said distal beam portion.

19. The bow of claim 18 wherein said central beam portion has a different cross sectional area than said distal beam portion.

20. The bow of claim 18 wherein said linkage attaching means further comprises a metal linkage attaching bracket molded into said distal beam portion.

* * * * *

UNITED STATES PATENT AND TRADEMARK OFFICE
CERTIFICATE OF CORRECTION

PATENT NO. : 5,427,429
DATED : June 27, 1995
INVENTOR(S) : David P. Piontek; John M. Yera; George W. Klein It is certified that error appears in the above-indentified patent and that said Letters Patent is hereby corrected as shown below:

On the title page, under Attorney, Agent, or Firm, "Harness, Dickey & Pierce" should be -- Harness, Dickey & Pierce, P.L.C. --.

Column 1, line 58, "a" (first occurrence) should be -- an --.

Column 1, line 61, after "according" insert -- to --.

Column 4, line 5, "pay" should be -- pad --.

Signed and Sealed this

Nineteenth Day of December, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,427,429
DATED : June 27, 1995
INVENTOR(S) : David P. Piontek; John M. Yera; George W. Klein It is certified that error appears in the above-indentified patent and that said Letters Patent is hereby corrected as shown below:

Title Page, item [73], under Assignee, please add --London Industries, Inc.,
Troy, Michigan--

Signed and Sealed this

Twenty-sixth Day of November 1996

Attest:

BRUCE LEHMAN

*Attesting Officer*      *Commissioner of Patents and Trademarks*